Oct. 7, 1958 G. G. SCOZZARI 2,854,781

FISHING TACKLE

Filed Nov. 7, 1955

INVENTOR.
GASPAR G. SCOZZARI
BY
*Herbert H. Smith*

United States Patent Office 2,854,781
Patented Oct. 7, 1958

2,854,781

FISHING TACKLE

Gaspar G. Scozzari, Garfield, N. J.

Application November 7, 1955, Serial No. 545,161

11 Claims. (Cl. 43—44.2)

This invention relates to fishing tackle, and more particularly to novel means for attaching line or artificial bait in a predetermined manner and position relative to one or more hooks advantageously positioned or arrayed to more readily catch a fish.

The present invention permits live bait to be secured to the end of a fishing line in a manner that does not appreciably shorten the life of the live bait, keeps the bait looking fresher and acting more lively over a prolonged period of time than other methods. Further, it allays loss of live bait by fish striking too short or by dragging the live bait through weeded areas.

Heretofore, various methods of securing bait to the hook at the end of a fish line have been employed. One method utilizes an elongated slender flexible rod or a semi-rigid wire which pierces the live bait, such as a minnow, longitudinally. The live bait's liveliness or action is restricted, and its life is unduly shortened, which in turn destroys the color of the bait. The placement of the fish hooks per se relative to the body of the live bait was frequently not the choice of the angler since he was limited in this regard by the particular design of the equipment. The present invention obviates the aforementioned undesirable features.

It is an object of the present invention to provide novel fishing equipment having means for securing and removing bait in a more desirable manner and keeping the bait intact.

Another object of the invention is to provide novel hook arrangements to dispose live bait on hook means in a more lifelike and natural appearance.

A further object is to provide fishing tackle with hook array arranged to increase the efficiency of the equipment.

The present invention contemplates a hook array having a longitudinal shank and three hook portions secured thereto and having the planes thereof disposed approximately 120° from one another, with two of said hook portions having their free ends directed substantially along a plane parallel to said shank and the free end of said third hook directed substantially normal to said shank and terminating approximately along the axis of said shank.

A variation of the invention includes hook arrays employed with an impaling element slidable along a leader which is secured to the hook array and having a barb or the like thereon as a further point of attaching a bait to obtain more desirable motions while being moved or trolled in the water.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

Figure 6:
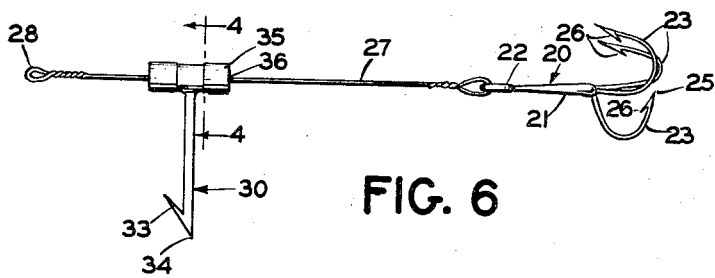
Fig. 6 is an enlarged side view of the hook array, leader and adjustable impaling element presented in Fig. 1.

Referring to the drawings, there is shown two preferred embodiments of the invention. The embodiment shown in Figs. 1 and 6 presents fishing tackle which has a particular use in trolling.

The hook array 20 has a shank 21 which is a rigid rod portion or stiff wire having an eye 22 at one end thereof and three hook portions 23 secured to or formed on the shank at the end thereof opposite the eye 22.

Each of the three hook elements 23 are substantially U-shaped, and each has one end secured to the shank with the opposite end terminating in a bar portion 26 as found on conventional fish hooks.

Figure 1:
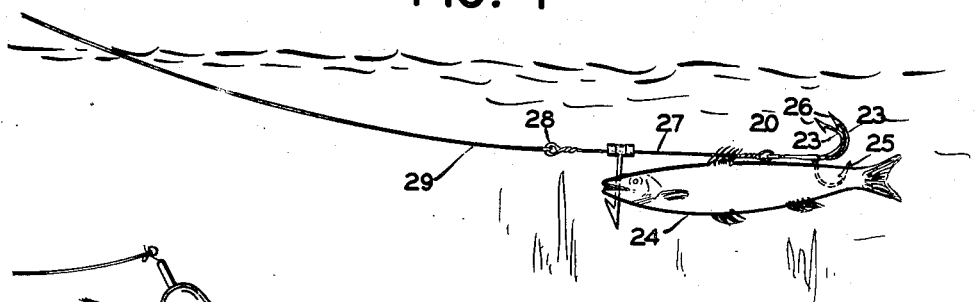
Fig. 1 shows one arrangement of the invention utilizing a unitary hook array and an impaling element on a leader.
Figure 2:
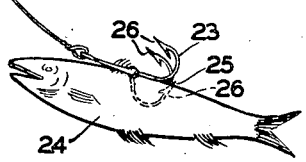
Fig. 2 shows the hook array only in use.
Figure 3:
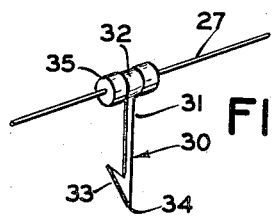
Fig. 3 shows a perspective view of the impaling element on a leader.

The plane of the U-shaped hook portions are substantially 120° apart, so that a live bait or small fish, frequently referred to as a minnow, may be secured on one hook element, such as the lower hook element in Figs. 1 or 2, and the backbone of the fish would be between the lower portion of the remaining two hook elements. This arrangement permits the live bait 24 to have the point 25 of the lower barb to be inserted into the fish, followed by relative swinging motion of the fish or live bait 24 between the two upper hook elements, until the live bait comes to rest in the position shown in either Figs. 1 or 2.

The two upper U-shaped hook elements have the points of their respective barbs directed substantially parallel to or in the general direction of the axis of the shank 21, while the point or barb of the lower hook element which retains the live bait is directed normal to the axis of the shank and terminates approximately in the area of the center of the shank axis.

The hook array 20 is connected to a wire leader 27 which ends in an eye or a swivel 28 and which is then connected to a fishing line 29.

An impaler 30 made preferably of metal has a body portion 31 with a loop 32 on one end thereof and a barb 33 on the other end thereof terminating in a point 34. The loop of the impaler 30 or impaling element fits around a slug or fitting 35 made of rubber having a longitudinal hole 36 therein to receive the leader 27.

The impaler 31 is movable along the leader 27 and is frictionally held in a particular position unless urged by sufficient force to a new position. The impaler 31 is used to hook into the lips of a live fish bait and holds the fish's mouth closed, thereby keeping bait alive longer as well as positioning the live bait on the leader and hook array, as shown in Fig. 1, to reduce the tendency of said bait to become entangled in weeds and other obstruction when trolling.

When used for still fishing, the hook array may be inserted in the live bait as shown in Fig. 2, and the impaler 30 need not be employed, and by securing the live bait as indicated in Fig. 2, the live bait is able to swim in a natural position.

Figure 5:
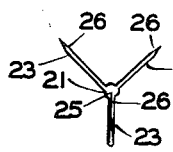
Fig. 5 is an end view of the hook array.
Figure 4:
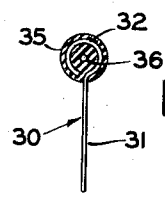
Fig. 4 is a sectional view taken along lines 4—4 of Fig. 6.

The end view shown in Fig. 5 indicates that the planes of the respective hook elements 23 are angularly disposed approximately 120 degrees from one another.

It will be seen that when the live bait 24 is attached to the lower hook element to assume the attitude shown in Fig. 1, the swinging action of the live bait will be enabled to start from the wide space between the upper portions of the upper hook elements. At the beginning of the swinging action the live bait will be in a position normal to that shown in Fig. 1, with the head of the live bait pointed downwardly. After the live bait is pierced, the perpendicular clockwise rotation about the point of the lower hook element will continue until the live bait is positioned as shown in Fig. 1.

While a leader is used to carry the impaler or impaling element, it is to be understood that an impaler may be connected to the hook array in any convenient manner so that a leader may be entirely eliminated, and the impaler may be carried, for example, on an elongated shank or body portion of the hook array.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. Fishing tackle having a hook array including a shank terminating in laterally extending upper and lower barbed hooks having substantially straight and curved portions, the straight portions of said upper hook extending generally parallel to the axis of said shank whereby the barb of said upper hook points back toward the beginning of said shank to catch a fish, the straight portions of said lower hook extending generally normal to the axis of said shank whereby the barb of said lower hook points back toward the axis of said shank to have bait fastened thereon, and means attached to said hook array and adapted to be connected to fishing line and including an element also adapted to be fastened to said bait.

2. Fishing tackle having a hook array and leader means connected thereto for use with a fishing line, said hook array including a shank terminating in upper and lower U-shaped hooks radiating from said shank, said U-shaped hooks having straight and curved portions, the straight portions of said upper hook extending generally parallel to the axis of said shank whereby the barb of said upper hook points back in the same direction and parallel to the axis of said shank to catch a fish, the straight portions of said lower hook extending generally perpendicular to the axis of said shank whereby the barb of said lower hook points back toward the axis of said shank and said leader means having independent fastening means associated therewith for attaching bait thereto.

3. Fishing tackle substantially as set forth in claim 2, and wherein said leader means includes a flexible elongated element connected to said hook array and said fastener means includes an impaler connected to said flexible elongated element.

4. Fishing tackle of the kind set forth in claim 2, and wherein said leader means includes a flexible elongated element and said fastener means includes an impaling element slidably attached to said flexible elongated element and including means for frictionally maintaining said impaler at a desired position on said leader means.

5. Fishing tackle of the kind set forth in claim 2 wherein said leader means includes a metallic wire, said fastener means includes a slug of resilient material disposed on said metallic wire, and an impaling element dependent from said slug.

6. A hook array adapted for use with fishing tackle, comprising a shank portion terminating in three U-shaped hook elements, each disposed in a different plane, the respective planes being approximately 120 degrees apart, the free end of two of said U-shaped hook elements being directed back toward said shank so as to be approximately parallel to the axis of said shank and the free end of the other of said U-shaped hook elements being directed back toward and approximately in a path normal to the axis of said shank.

7. A hook array as set forth in claim 6, and wherein a leader is connected to said hook array, an impaling element and means for slidably mounting said impaling element on said leader including means for frictionally holding said impaling element on said leader.

8. A hook array adapted for use with fishing tackle comprising an elongated shank terminating in three U-shaped hooks disposed in different planes laterally and symmetrically intersecting the axis of said shank, the free end of each of said hooks terminating in a barb, two of said barbs lying in their planes and being directed parallel to said shank and the third barb lying in its plane and being directed perpendicular to said shank, whereby the bait may be attached to the third hook and the other two hooks will lie above said bait to reduce the tendency of the hook array to become entangled in weeds.

9. An impaler, adapted to be attached to a leader to hold a minnow on a hook as bait, comprising a body having a loop at one end and a barb at the other end, a slug of resilient material fitted in said loop for frictionally engaging said leader whereby a portion of said minnow may be fastened to said hook and said body may be so positioned on said leader that said barb holds another portion of the minnow, said body tending to remain at its last position.

10. Apparatus for using a minnow as live bait, comprising an elongated shank, a leader at one end of said shank, three hooks extending laterally from the other end of said shank, two of said hooks each having one end extending generally axially from said shank, and having free ends curving back toward said first mentioned end and terminating as barbs, said barbs being substantially parallel to said shanks, the third of said hooks having one end extending generally perpendicular from said shank and a free end curving back to terminate as a barb pointing toward and substantially perpendicular to the axis of said shank, whereby said third hook may be inserted into the rear back portion of said minnow so that the backbone may be disposed between said two hooks, and an impaler frictionally held in position on said leader and having a barb extending perpendicular to said leader for hooking into the lips of said minnow.

11. A hook array for securing bait and catching fish comprising a shank having means at one end for fastening said array to a fishing line and having its other end terminating in at least two laterally extending barbed hooks having substantially straight and curved portions, the straight portions of one of said hooks extending generally parallel to the axis of said shank whereby the barb of said hook points back toward the beginning of said shank to catch a fish, and the straight portions of said other hook extending generally normal to the axis of said shank whereby the barb of said other hook points back toward the axis of the shank to secure the bait.

References Cited in the file of this patent

UNITED STATES PATENTS

| 70,913 | Sterling | Nov. 12, 1867 |
| 289,612 | Bollerman | Dec. 4, 1883 |
| 705,073 | Grover | July 22, 1902 |
| 2,553,895 | Carter | May 22, 1951 |
| 2,591,764 | Allen | Apr. 8, 1952 |
| 2,700,242 | Porth | Jan. 25, 1955 |
| 2,800,740 | Glaze | July 30, 1957 |

FOREIGN PATENTS

| 10,851 | Great Britain | May 24, 1905 |